Sept. 19, 1950    J. M. MOCHEL    2,522,531
METHOD OF PRODUCING ELECTRICALLY CONDUCTING
COATINGS ON GLASS AND MICA SHEETS
Filed Nov. 3, 1947
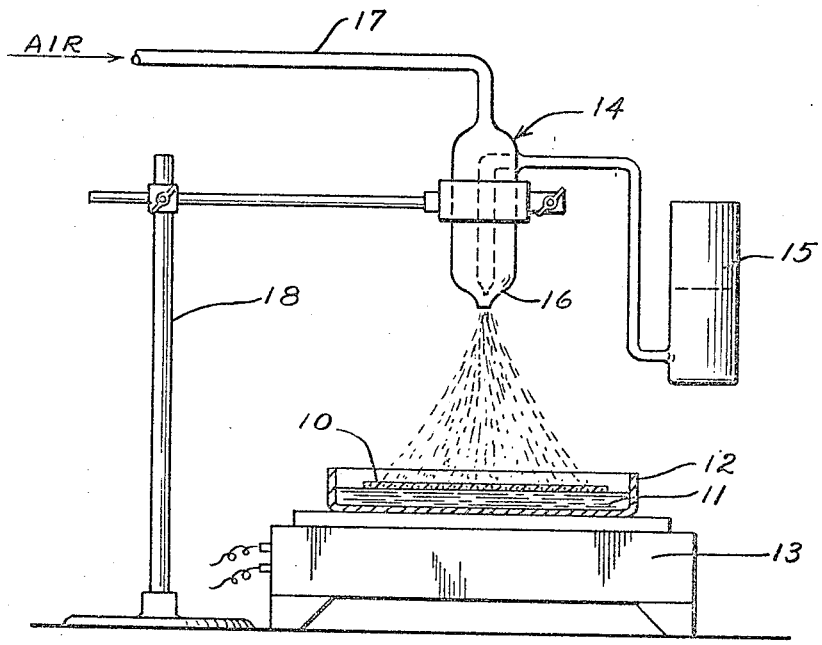
INVENTOR.
JOHN M. MOCHEL
BY
R. E. Schneider
ATTORNEY Patented Sept. 19, 1950

2,522,531

UNITED STATES PATENT OFFICE 2,522,531

METHOD OF PRODUCING ELECTRICALLY CONDUCTING COATINGS ON GLASS AND MICA SHEETS

John M. Mochel, Corning, N. Y., assignor to Corning Glass Works, Corning, N. Y., a corporation of New York Application November 3, 1947, Serial No. 783,847

5 Claims. (Cl. 117—54)

In my pending applications, Serial Numbers 771,859; 771,860; and 771,861, all of which were filed September 3, 1947, I have described and claimed electrically conducting iridized coatings on glass and other vitreous or non-porous ceramic bodies and methods of making them. Such coatings are produced by heating the glass or ceramic and contacting it with the vapors of certain metal salts or mixtures of salts formed either by heating the salts per se or atomizing solutions thereof. The electrically conducting layer thus produced is strongly adherent and by analysis appears to be an oxide or mixture of oxides of the metal or metals employed. The process is known as iridizing because the coatings frequently appear iridescent due to interference of light waves reflected from the extremely thin oxide films and from the glass surface.

Glass in a thickness of several millimeters is relatively easy to iridize because it can be heated without difficulty at the optimum iridizing temperature, 600°–700° C., and no unusual difficulties are encountered during the subsequent steps of iridizing.

Unexpected difficulties are encountered when it is attempted to iridize mica or glass in thin sheets, 30 mils or less in thickness. Their heat capacities are small and they cannot be maintained at optimum iridizing temperature by ordinary means during the process. Overheating, uneven heating, or too rapid heating causes localized cleavage of the mica or the formation of blisters. In the case of glass, uneven heating of the thin sheets results in non-uniformity of thickness, of electrical resistance and of adherence of the coating.

Mica or glass having a thickness of a few mils and having a transparent electrically conducting coating is highly desirable as a picture-forming screen in an iconoscope tube.

The principal object of this invention, therefore, is to provide a thin sheet of mica or glass having on its surface an electrically conducting and preferably transparent iridized coating.

Another object is to provide a method for forming such coatings on mica while at the same time avoiding blistering and uneven heating of the mica and poor adherence of the coating.

To these and other ends the invention comprises floating the mica or glass on a molten metal which has a melting point not exceeding about 700° C., such as tin, at a temperature between 600°–700° C., holding down the edges of the mica or the glass and iridizing the mica with a salt of tin or a mixture comprising a tin salt and another metal salt or salts such as a mixture of a tin salt and an antimony salt, a mixture of a tin salt and an indium salt, a mixture of a tin salt, an indium salt and a cadmium salt, a mixture of a tin salt, an antimony salt and a zinc salt, and similar mixtures which are described in my pending applications mentioned above. In the first named pending application it is shown that liquid antimony pentachloride (SbCl$_5$) may be dissolved directly in liquid anhydrous stannic tetrachloride (SnCl$_4$), which mixture may be vaporized by a stream of air passed through it. Preferably, iridizing is accomplished by exposing the mica while so heated to a finely atomized mist of a solution containing stannic tetrachloride pentahydrate, SnCl$_4$·5H$_2$O, and antimony trichloride, SbCl$_3$, in the ratio of 100 parts by weight of the tin salt to one part by weight of the antimony salt. Any common metal which melts below 700° C., such as tin, lead, zinc, aluminum, cadmium, bismuth, and antimony, may be employed as the supporting medium, but tin is preferable because its rate of oxidation is relatively slow and it is not particularly expensive nor dangerous. Some low melting metals are too expensive, such as gallium and indium; others are poisonous, such as thallium; others are too reactive, such as magnesium or lithium. The invention does not contemplate the use of such metals.

The accompanying drawing is a side view partly in section of one form of apparatus for carrying out the above described process. A thin mica sheet 10 (shown with greatly exaggerated thickness) is disposed on molten tin 11 which is in a shallow open container 12. The container 12 is heated on an electric hot plate 13. An atomizer, generally designated 14 and preferably composed of glass, comprises a cup 15 containing a solution of salts to be atomized, an atomizing nozzle 16 and a tube 17 for introduction of compressed air to the nozzle. The atomizer 14 is held by a support 18 so that the nozzle 16 is about one foot above the mica sheet 10.

In operation the container 12 and tin 11 are maintained at the desired temperature by the hot plate 13. Atomization of liquid from the cup 15 upon the mica sheet 10 is accomplished by admitting compressed air through the tube 17.

In order to avoid blistering or cleavage of the mica, it should not be brought into contact with the molten tin suddenly. Before permitting it to rest upon the surface of the molten tin it should be preheated for a few minutes, preferably by supporting it above the surface of the molten tin as by means of tongs or by laying it over the edge of the container which holds the molten tin.

Inasmuch as clean molten tin tends to wet mica and adhere to it, the presence of a thin unbroken film of oxide on the surface of the molten tin is desirable. Such a film of oxide forms readily when the molten tin is exposed to air.

To provide satisfactory adherence of the iridized coating to the mica, the coatings should be kept relatively thin and the mica surface should be uncontaminated by grease or moisture such as may result from handling the mica with bare hands. The thickness of the coating can easily be controlled by controlling the concentration of the iridizing solution and the length of time the mica is treated therewith, shorter times and more dilute solutions producing thinner films. The thickness of the film is estimated by comparing its apparent color, caused by interference, with the well-known color sequence of the Newton interference colors described in "A Treatise on Light," by R. A. Houstoun, Longmans Green & Co. Ltd., (1938) page 147. The interference color of the film should be beyond white of the first order, and preferably should be first order yellow.

For example, a sheet of mica having a thickness of about 1 mil was carefully placed upon the surface of molten tin at 600° C. as described above, the tin being in a stainless steel container. A solution containing the equivalent of 98.5% $SnO_2$ and 1.5% $Sb_2O_3$ and consisting of 100 grams $SnCl_4 \cdot 5H_2O$, 1 gram $SbCl_3$, 50 cc. $H_2O$ and 10 cc. HCl was atomized as a fine mist against the heated mica for from 2½ to 5 seconds until a first order yellow interference color was observed, whereupon atomization was stopped and the mica was removed from the molten tin. The electrical surface resistance was measured and found to be about 100 ohms per square unit of surface.

Glass sheets thinner than about 30 mils can also be treated by this method with the same results.

I claim:

1. The method of producing an electrically conducting coating on a thin sheet of a substance selected from the group consisting of glass and mica, which comprises floating the sheet on a molten bath containing a metal selected from the group consisting of zinc, cadmium, aluminum, tin, lead, antimony and bismuth maintained at a temperature between 600° and 700° C., and contacting the heated floating sheet with a vapor containing stannic chloride until an interference color beyond white of the first order appears thereon.

2. The method of producing an electrically conducting coating on a tin sheet of a substance selected from the group consisting of glass and mica, which comprises floating the sheet on a molten bath containing tin maintained at a temperature between 600° and 700° C., and contacting the heated floating sheet with a vapor containing stannic chloride until an interference color beyond white of the first order appears thereon.

3. The method of producing an electrically conducting coating on a thin sheet of a substance selected from the group consisting of glass and mica, which comprises floating the sheet on a molten bath containing tin maintained at a temperature between 600° and 700° C., and atomizing against the heated floating sheet a solution containing stannic chloride until an interference color beyond white of the first order appears thereon.

4. The method of producing an electrically conducting coating on a thin sheet of a substance selected from the group consisting of glass and mica, which comprises heating molten tin to between 600° and 700° C. to form on its surface a thin layer of stannic oxide, placing the sheet on the oxide layer, and atomizing against the heated floating sheet a solution containing stannic chloride until an interference color beyond white of the first order appears thereon.

5. The method of producing an electrically conducting coating on a thin sheet of a substance selected from the group consisting of glass and mica, which comprises floating the sheet on a molten bath containing tin maintained at a temperature between 600° and 700° C., and atomizing against the heated floating sheet an aqueous solution containing $SnCl_4 \cdot 5H_2O$ and $SbCl_3$ in the proportions of 100 parts by weight of the tin salt to one part by weight of the antimony salt until an interference color beyond white of the first order appears thereon.

JOHN M. MOCHEL.

REFERENCES CITED

The following references are of record in the file of this patent:

UNITED STATES PATENTS

| Number | Name | Date |
|---|---|---|
| 2,026,086 | Farncomb | Dec. 31, 1935 |
| 2,118,795 | Littleton | May 24, 1938 |
| 2,165,773 | Wheeler | July 11, 1939 |